United States Patent [19]

Nguyen et al.

[11] Patent Number: 4,956,158
[45] Date of Patent: Sep. 11, 1990

[54] STABILIZATION OF FLUORIDES OF SPENT POTLINING BY CHEMICAL DISPERSION

[75] Inventors: Quyen C. Nguyen; Herman J. Hittner, both of Lower Burrell, Pa.

[73] Assignee: Aluminum Company of America, Pittsburgh, Pa.

[21] Appl. No.: 174,863

[22] Filed: Mar. 29, 1988

[51] Int. Cl.$^5$ .............................................. C01F 7/02
[52] U.S. Cl. .................................. 423/111; 106/705; 106/789; 204/67; 423/115; 423/130; 501/28; 501/128; 501/155
[58] Field of Search .................. 106/103, 117; 204/67; 423/111, 115, 119, 130; 501/28, 125, 128, 155

[56] References Cited

U.S. PATENT DOCUMENTS

| | | | |
|---|---|---|---|
| 69,318 | 10/1867 | Cheyney et al. | |
| 2,732,283 | 1/1956 | Clukey | 23/88 |
| 2,776,900 | 1/1957 | Duncan et al. | 106/52 |
| 3,386,394 | 6/1968 | Heise | 110/14 |
| 3,556,024 | 1/1971 | Fuller | 110/1 |
| 3,964,916 | 6/1976 | Armistead et al. | 106/38.27 |
| 4,046,086 | 9/1977 | von Dreusche | 110/12 |
| 4,053,375 | 10/1977 | Roberts et al. | 204/67 |
| 4,113,832 | 9/1978 | Bell et al. | 423/119 |
| 4,160,808 | 7/1979 | Andersen et al. | 423/119 |
| 4,436,550 | 3/1984 | Kopalyi | 106/117 |
| 4,437,419 | 3/1984 | Hertel | 110/259 |
| 4,444,740 | 4/1984 | Snodgrass et al. | 423/483 |
| 4,512,809 | 4/1985 | Nielsen et al. | 106/103 |
| 4,640,681 | 2/1987 | Sternbiss et al. | 432/14 |
| 4,735,784 | 4/1988 | Davis et al. | 423/484 |

OTHER PUBLICATIONS

Mizuno, H.; Ono, N.; Tozawa, S.; "Recovery of Fluoride and Fluorine Balance of Aluminum Smelting Plant"; Light Metals, 1981, pp. 407–419.

Ogden Enviromental Services Inc., Phase 2 Delelopment of the Circulating Bed Combustion of Spent Potliners, Sep. 1987, pp. iii to 3–50.

Arkansas Democrat, Alcoa Uses Plant Near Benton to Burn New York Wastes, Little Rock, AK, 30486.

Primary Examiner—Robert L. Stoll
Assistant Examiner—Wayne A. Langel
Attorney, Agent, or Firm—Douglas G. Glantz

[57] ABSTRACT

The present invention provides a process for treating spent potlining from the electrolytic smelting of aluminum in cryolite including burning the spent potlining to form an ash, mixing with a siliceous material either before or after the ash-forming step, and heating to form a residue suitable for landfill. The ash and siliceous material are mixed in a specified mole ratio of at least about 1.4 silicon to sodium. The process further includes cooling the residue rapidly.

The residue formed by the process of the present invention produces a spent potlining suitable for landfill characterized by a low leachability of fluorine in water.

9 Claims, 2 Drawing Sheets

PHASE DIAGRAM OF THE $Na_2O-SiO_2-Al_2O_3$ SYSTEM

LEACHABLE FLUORIDES MEASURED IN SPL PRODUCTS

STABILIZATION OF FLUORIDES OF SPENT POTLINING BY CHEMICAL DISPERSION

This invention relates to the disposal of spent potlining by incineration.

Aluminum is produced commercially by the electrolytic smelting of alumina in an electrolytic bath of fused cryolite. Relatively pure alumina is reduced in the cryolite ($3NaF \cdot AlF_3$) in an electrolytic cell (named Hall-Heroult cell after the earliest developers of the electrolytic process for producing aluminum). The reaction is carried out in the Hall-Heroult cell process in an aluminum reduction pot in which alumina is dissolved in the molten cryolite bath. The alumina in solution in the molten cryolite is electrolyzed to form metallic aluminum. Aluminum produced in the reaction is heavier than the electrolyte and forms a molten layer at the bottom of the reduction pot which serves as the cathode of the cell. Carbon anodes extend into the bath, and oxygen liberated at the anode oxidizes carbon on the electrode.

The electrolyte composition is an important factor in the aluminum production process. The electrolyte contains cryolite and fluorspar (calcium fluoride, $CaF_2$). Excess aluminum fluoride is present with dissolved alumina in the electrolyte to reduce the liquidus temperature to the point where the cell can be operated in the range of about 940–980° C.

Gases are emitted by the batteries of reduction pots in the Hall-Heroult cell process. The emitted gases include carbon dioxide, volatilized fluorides, and gaseous hydrogen fluoride. Particulate solids, including fine alumina, cryolite, carbon, and inorganic compounds are elutriated from the electrolytic bath with the gases. Small amounts of lithium, calcium, silica, iron, sodium sulphate, and magnesium are present also in the gas streams as solid particles.

The reduction cells in the commercial electrolytic potlines are lined with a carbonaceous material. During the life of the cells, the carbonaceous material linings are degraded gradually by penetration of bath materials into the lining, e.g., such as by penetration by metallic aluminum, cryolite, and alumina. In the high temperatures of the electrolytic reduction process, the carbonaceous material ages gradually and degrades over time. Eventually, the unusable or "spent" potlining must be removed and discarded.

It is known that spent potlining from aluminum reduction cell linings contain a significant quantity of carbonaceous material, a mixture of fluoride salts, some low levels of cyanide, and alumina ($Al_2O_3$).

The Environmental Protection Agency is considering classifying spent potlining from the Hall-Heroult cell as a solid waste hazardous material because of the hazardous and solid waste amendments of 1984. Spent potlining cannot be landfilled because of cyanide content (approximately 1,000 parts per million) and because of its high content of leachable fluoride (3,000 to 8,000 milligrams per liter) from an approximately 18% total fluoride in the spent potlining.

Several methods already have been recommended for the recovery of fluoride salt and alumina content of the spent potlining material. One method involves the pyrohydrolysis of the spent cell material or potlining in a fluidized bed reactor. Pyrohydrolysis involves contacting a fluidized bed of spent potlining with water or steam to react with the fluorine compounds to form hydrogen fluoride. Sodium fluoride and other sodium compounds in the potlining react to form sodium fluoride and sodium oxide vapors. The sodium fluoride and sodium oxide vapors are produced in the pyrohydrolysis reactions.

It is known to use limestone, calcium carbonate, to react with fluoride in the spent potlining at about 700–780° C. to form a calcium fluoride. However, the final product still has a high level of leachable fluoride. An article in *Light Metals*, 1981, entitled "Recovery of Fluoride and Fluorine Balance of Aluminum Smelting Plant" describes a process of spent potlining wherein the potlining is crushed, incinerated, and introduced into a crusher for pulverizing, and extraction of the fluorides into water. After filtration, the material is introduced into a mixing tank, and sulfuric acid and calcium carbonate are added to produce calcium fluoride. The slurry is desiccated, and the sludge sent to a disposal site. The fluoride-containing filtrate is used as the scrubbing solution in a wet scrubber.

U.S. Pat. No. 4,113,832 discloses a process wherein spent potlining is leached with a caustic solution followed by a precipitation of sodium fluoride by saturating the leach liquor with a compound to suppress the solubility of the sodium fluoride in the leach liquor. The preferred compound is ammonia. The precipitated sodium fluoride is removed, and the leach solution saturated with ammonia is processed to remove the ammonia.

U.S. Pat. No. 4,444,740 discloses a process for removing and recovering fluoride values from spent potlining by leaching with a dilute caustic. The leachate is treated with a calcium compound to precipitate calcium fluoride.

The prior methods for removing and recovering fluorides from spent potlining are expensive ways to avoid the problem of spent potlining disposal with fluorides and cyanides present. Prior methods adopt the approach of removing and recovering the fluoride. These prior art methods are expensive by reason of the raw material costs assigned to the process and also by reason of the process steps which must be carried out to remove and recover the fluorides.

It is an object of the present invention to provide an inexpensive method for eliminating the problem of disposal of spent potlining containing fluorides.

It is another object of the present invention to provide an inexpensive method for the disposal of spent potlining which reduces degradation of the environment.

These and other objects of the present invention will become apparent from the detailed description which follows.

SUMMARY OF THE INVENTION

The present invention provides a process for treating spent potlining from the electrolytic smelting of aluminum in cryolite including burning the spent potlining to form an ash, mixing with a siliceous material either before or after the ash-forming step, and heating to form a residue suitable for landfill. The ash and siliceous material are mixed in a specified mole ratio of at least about 1.4 silicon to sodium. The process further includes cooling the residue rapidly The residue formed by the process of the present invention produces a glassy residue suitable for landfill characterized by a low leachability of fluoride in water.

DETAILED DESCRIPTION

The process of the present invention provides a method of stabilizing hazardous elements such as cyanides and fluorides in spent potlining and some other toxic wastes such as chromate sludges. The stabilization consists of dispersing them in a stable sodium silicate network by chemi-dispersion. It has been found that the process in accordance with the present invention provides an unexpectedly low leachability of otherwise hazardous elements, including a leachability of fluorides at a level less than about 25 milligrams per liter.

It has been found that siliceous material is an efficient reactant to stabilize fluorides in spent potlining in a silicon network. A chemi-dispersion technique favors the formation of the stable chemical bonding (Si—F) between silicon and fluorine atoms.

Figure 1:
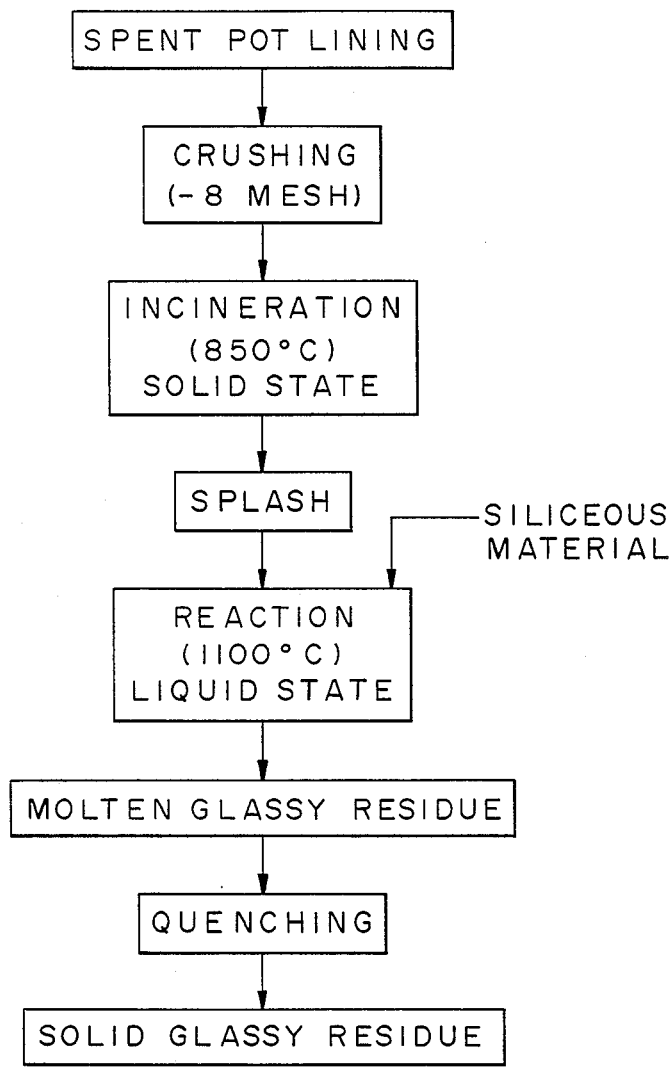
FIG. 1 shows a schematic flow diagram of a process in accordance with the present invention.

A schematic flow diagram of the process of the present invention is depicted in FIG. 1. Referring now to the flow diagram, spent potlining from a Hall-Heroult cell for the electrolytic smelting of aluminum is fed to the crushing step where the potlining is crushed and sized to a particle size less than about 8 mesh Tyler Series. This crushing step can be performed using a common technique such as a jaw crusher as would be known to one of ordinary skill in the art, and requires low levels of energy.

The crushed and sized particles of spent potlining are passed to the incineration step which is carried out by heating the spent potlining in the solid-state to form an ash at a relatively low temperature. By relatively low temperature is meant 850° C. to maintain the particles at a solid-state condition, but to achieve the objective of burning cyanides and carbonaceous materials to form an ash. Ash from the incineration step is then fed to a reactor for a reaction step.

The reaction step involves mixing with siliceous material and heating to form a liquid mixture. The siliceous material optionally may be added prior to the ash-forming step. The reaction step will require heating to a temperature in a range above about 1,000° C., preferably about 1100° C.

The process in accordance with the present invention requires that the mixture in the reaction step be formulated in specific proportions, i.e., in the amount of at least 1.4 molar ratio of silicon to sodium. The specified proportion has been found from an empirical investigation described later in this patent disclosure. The reaction product forms a molten residue which preferably is quenched rapidly to form a solid residue.

The incineration step performed immediately after the crushing step is carried out by burning the crushed and sized spent potlining at a temperature to maintain a low fluorine vapor pressure. The incineration temperature can be specified in the range of about 800-850° C. to maintain low fluorine emissions. In one aspect, the process of the present invention performs the incineration step by burning low levels of cyanide in spent potlining in a co-current flow reactor.

An auxiliary step in the process of the present invention involves determining the sodium content of ash formed in the incineration step. The sodium content is determined analytically by atomic absorption spectroscopy.

The reaction step is carried out at a temperature of at least about 1,000° C., preferably in the range of about 1000-1100° C., and more preferably at a reaction temperature of about 1100° C. ±about 20° C. The siliceous material added into the reaction step can be provided by natural siliceous material such as sand, volcanic rocks, or basalt or a artificial siliceous material including slags from a blast furnace, glass culets, or the like. The siliceous material should avoid using a silicon oxide having a high crystallinity to eliminate the need for a high temperature for fusing the mixture in the reaction step. In this regard, siliceous material having a high crystallinity, e.g., such as characteristic of quartz, should be limited to less than about 10% of the siliceous material added into the reaction mixture. Otherwise, in one aspect, the ratio of siliceous material to spent potlining optionally may be increased to a molar ratio higher than at least about 1.4 silicon to sodium.

The molten glassy residue formed in the reaction step should be cooled rapidly. The residue can be cooled to a solid glassy residue by water quench.

The solid glassy residue produced by the process of the present invention is characterized by low leachability of fluorine and water. In one aspect, the low leachability comprises less than about 100 parts per million fluorine. Preferably, the low leachability comprises less than about 50 parts per million fluorine, and it has been found that leachability of less than about 24 ppm fluorine is achievable by the process of the present invention. The low leachability of the product produced by the process of the present invention is important to satisfy the requirements of landfill disposal of the spent potlining. Otherwise, rain water in contact with the spent potlining disposed in the landfill would leach out the fluorine and create hazardous liquid in the landfill and unacceptable environmental degradation.

The process of the present invention can be described as a chemi-dispersion technique to offer the very low leachability of fluorides. Analytical techniques including X-ray Diffraction Spectroscopy, X-ray Fluorescent Spectroscopy, and Fourier Transform Infrared Spectroscopy indicate that the chemical bonding between silicon and fluorine atoms in the products form a Si—F covalent bond having a bond strength of about 135 Kcal per mole. The covalent bond of high bond strength make the fluoride stable in the silicate structure in the solid glassy residue product of the process of the present invention. On a macroscopic scale, the covalent bonding produced in the present invention translates into a low fluoride leachability even when the total leaching surface area of the crushed material is increased significantly.

In addition to fluoride scavenger function, the sodium disilicate systems also serve as a high temperature dispersion agent for other mineral compounds during the fluoride stabilization process. Some minerals were originally present in spent potlining such as calcium fluoride, sodium aluminate. Other wastes such as chromium sludge waste, non-useable lubricant oil filter cake, and contaminated cast iron can be stabilized with the process. It has been found that the chromium complex, by way of example, has been fully stabilized in the silicate network and the product obtained from the process of the present invention.

Figure 2:
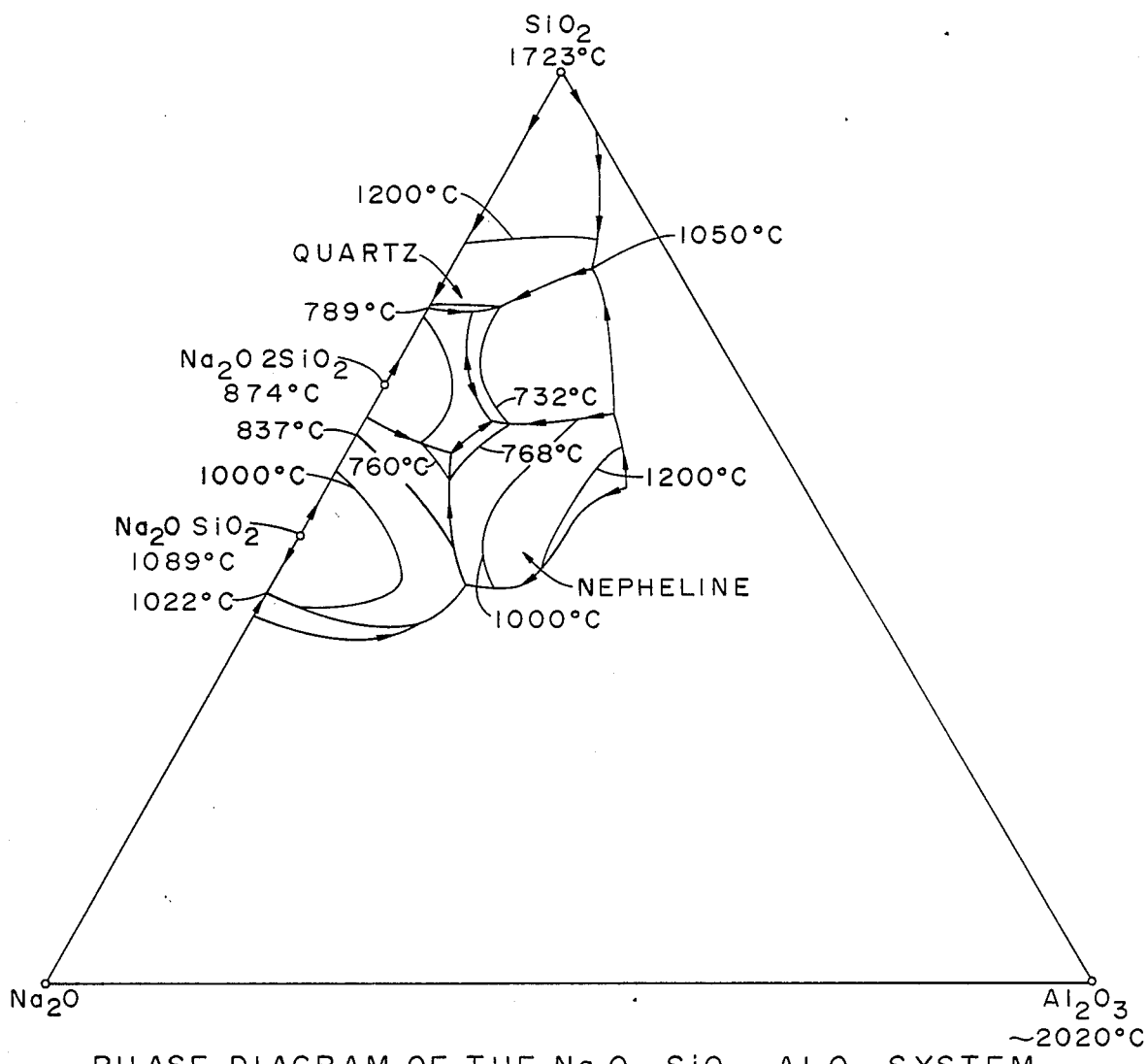
FIG. 2 provides a phase diagram of the $Na_2O$—$SiO_2$—$Al_2O_3$ system.

The process of the present invention has been found empirically. A theoretical approach would have suggested a lower molar ratio of silicon to sodium. A phase diagram of the $Na_2O$—$SiO_2$—$Al_2O_3$ system is depicted in FIG. 2. The phase diagram indicates that the compositions close to sodium disilicate ($Na_2O \cdot 2SiO_2$) have low melting points, e.g., such as about 800° C. In this regard, one would have added a silicon material to the spent potlining mixture based on a theoretical molar ratio of silicon to sodium at or about 1:1 to form silicon disilicate systems. Besides sodium, other constituents of spent potlining were viewed as a whole entity in a ternary system of $Na_2O \cdot 2SiO_2 \cdot X$. Such a system is available in published literature only when some of the X component was a pure compound.

Figure 3:
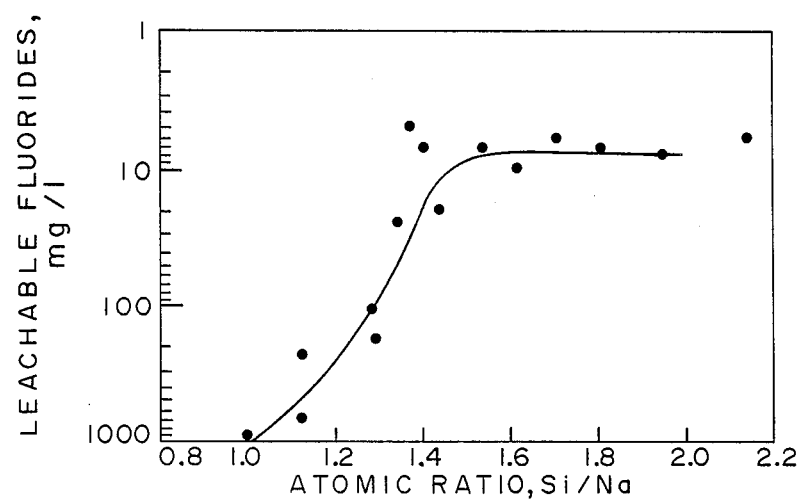
FIG. 3 presents a graphical illustration of the empirical results obtained by the process of the present invention.

However, it has been found empirically that a threshold ratio of siliceous material to sodium must be admixed at least about 1.4:1 molar ratio of silicon to sodium. Referring now to FIG. 3, a graphical illustration is depicted of leachable fluorides concentration per molar ratio of silicon to sodium. It has been found that leachable fluorides are significantly reduced at molar ratios above about 1.4. For this reason, the process of the present invention requires a minimum molar ratio of silicon to sodium of about 1.4:1 and provides an unexpectedly low fluoride leachability in the solid glassy residue product of the present invention.

The incineration step is performed at a temperature of about 825° C.±25° C. without additives, so that fluoride emissions are observed to be insignificant. The incineration step operating on a −8 mesh Tyler Series particle size of spent potlining is carried out at about 825° C. with a residence time of three to four hours.

Spent potlining particles are very dense. The particles should be small enough to expose all carbonaceous materials to sufficient oxygen for complete combustion. The burning temperature should not exceed 880° C. to avoid melting cryolite bath. Otherwise, higher temperatures unexpectedly are detrimental to carbon combustion.

The reaction step is carried out to dissolve and to disperse all mineral impurities including fluorides in the liquid slag. The liquid $Na_2O \cdot 2SiO_2$ system provides a low melting point, e.g., such as about 800° C. and a high capability to dissolve other minerals. Sodium content in the spent potlining is high enough to react with siliceous material, e.g., in the form of sand, to achieve a $Na_2O \cdot 2SiO_2$ liquid phase. Sodium oxalate from industrial bauxite extraction residue also can be added to the molten sodium silicate if the slag is low in sodium content.

Operating costs of the present invention are low because the dry process requires only a low grade siliceous material, e.g., sand with impurities permissible such as iron, calcium, and magnesium. The spent potlining can be crushed and ground using a common technique such as a jaw crusher which requires low levels of energy and relatively low costs. The incineration step to form the ash from the crushed and sized spent potlining requires low levels of supplemental energy because the carbon of the spent potlining is burned and contributes a fuel value to the incineration step. The reaction step carried out to achieve stabilization of fluorides in the silicon network requires low levels of energy because the reaction step does not absorb heat substantially, but only requires sufficient energy of fusion to melt the siliceous material. The process of the present invention does require process control management practices to schedule the treatment of raw materials to carry out the process efficiently. The process also requires monitoring of the product to ensure environmental specifications are achieved.

The molten glassy residue of the present invention should be cooled rapidly to avoid the devitrification that favors the formation of soluble fluorides in the product, especially sodium fluoride. The rapid cooling provides a controlled freezing action to maintain a meta-stable structure in which the fluorine atoms are attached to the silicate network. The existence of this amorphous phase has been found and substantiated by X-ray Diffraction Spectroscopy. The confirmation of the existence of the chemical bonding of Si—F has been found and confirmed by Fourier Transform Infrared Spectroscopy.

While the invention has been described in terms of preferred embodiments, the claims appended hereto are intended to encompass all embodiments which fall within the spirit of the invention.

What is claimed is:

1. A process for treating spent potlining from the electrolytic smelting of aluminum in cryolite comprising:
    (a) heating spent potlining to burn carbonaceous material at a temperature low enough to maintain a low fluorine vapor pressure and form an ash;
    (b) admixing siliceous material either before or after said ash-forming step;
    (c) heating said ash and siliceous material to form a glassy residue suitable for landfill; and
    (d) cooling said residue rapidly.

2. A process as set forth in claim 1, said heating comprising heating to a temperature above about 1,000° C.

3. A process as set forth in claim 1 wherein said temperature ranges from about 1000–1100° C.

4. A process as set forth in claim 3 wherein burning comprises burning at a temperature of about 800–850° C. to maintain low fluorine emissions.

5. A process as set forth in claim 4 comprising pretreating spent potlining by crushing.

6. A process as set forth in claim 5 wherein said pretreating further comprises sizing the crushed spent potlining to minus 8 mesh Tyler Series.

7. A process as set forth in claim 6 wherein said burning further comprises burning low levels of cyanide in a co-current flow reactor.

8. A process for providing a spent potlining product characterized by a low leachability of fluorine in water comprising:
    (a) incinerating spent potlining at a temperature in the range of about 800–850° C. to form an ash;
    (b) mixing said ash with siliceous material;
    (c) heating to form a glassy residue suitable for landfill; and
    (d) cooling said residue rapidly.

9. A process as set forth in claim 8 comprising crushing and sizing said spent potlining to form a feed to said incinerating step sized less than 8 mesh Tyler Series.

* * * * *